(No Model.) 3 Sheets—Sheet 1.
M. WARREN.
APPARATUS FOR TREATING BEER OR OTHER LIQUIDS.
No. 533,105. Patented Jan. 29, 1895.

WITNESSES:
W. W. Shaw
F. B. Packard

INVENTOR
Marion Warren
BY
Murphey & Metcalf
ATTORNEYS (No Model.) 3 Sheets—Sheet 2.
M. WARREN.
APPARATUS FOR TREATING BEER OR OTHER LIQUIDS.
No. 533,105. Patented Jan. 29, 1895.

WITNESSES:
D. A. Carpenter
C. C. Miller

INVENTOR
Marion Warren,
BY Murphey & Metcalf
ATTORNEYS (No Model.) 3 Sheets—Sheet 3.
M. WARREN.
APPARATUS FOR TREATING BEER OR OTHER LIQUIDS.
No. 533,105. Patented Jan. 29, 1895.
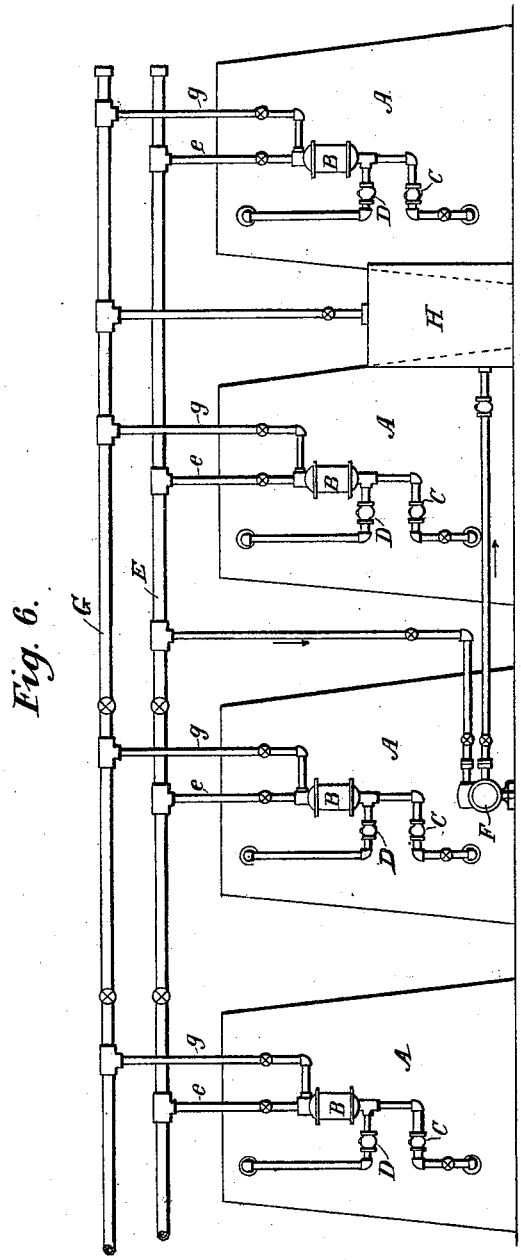
WITNESSES:
D. A. Carpenter
C. C. Miller
INVENTOR
Marion Warren,
BY Murphey & Metcalf
ATTORNEYS

UNITED STATES PATENT OFFICE.

MARION WARREN, OF NEW YORK, N. Y.

APPARATUS FOR TREATING BEER OR OTHER LIQUIDS.

SPECIFICATION forming part of Letters Patent No. 533,105, dated January 29, 1895.

Application filed August 11, 1893. Serial No. 482,897. (No model.)

*To all whom it may concern:*

Be it known that I, MARION WARREN, of the city, county, and State of New York, have invented a certain new and useful Improvement in Apparatus for Treating Beer or other Liquids, of which the following is a full, clear, and exact description, reference being had to the accompanying drawings, forming part of this specification.

My invention relates to apparatus for the manufacture of beer and other like fermented beverages or liquids, and is adapted to be used in connection with the method and apparatus embodying the employment of a partial vacuum, set forth in a portion of the claims of my United States Letters Patent, No. 510,219, dated December 5, 1893.

The object of the invention is the provision of simple, inexpensive and reliable mechanism for maintaining an automatically controlled and regulated flow of the beverage or liquid through a vessel or chamber in which it is subjected to the action of a partial vacuum, for the purpose of accelerating the ripening thereof, as more particularly set forth in my said patent; and to this end my invention consists generally of a circulating chamber into which the liquid is drawn by creating a partial vacuum in the chamber, and from which it is caused to flow by relieving the vacuum, preferably, where beer is the liquid under treatment, by admitting to the chamber the carbonic acid gas which has been drawn from the beer in its circulation through the chamber.

It also consists in the novel construction, arrangement and combination of parts and details herein described and shown and specifically set forth in the claims.

Figure 1:
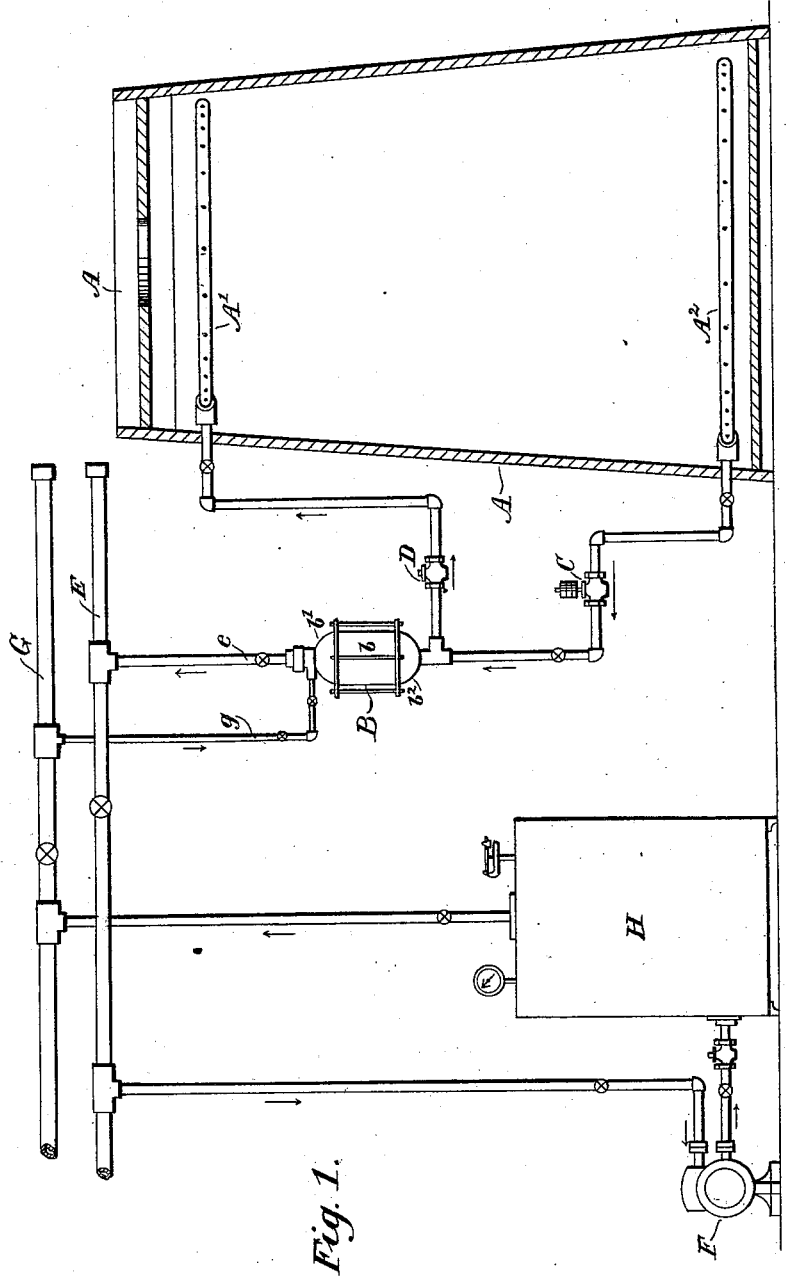
Figure 3:
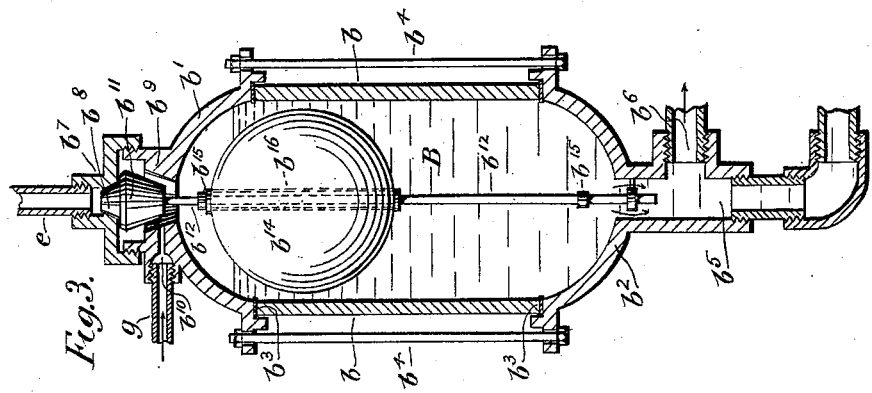
Figure 4:
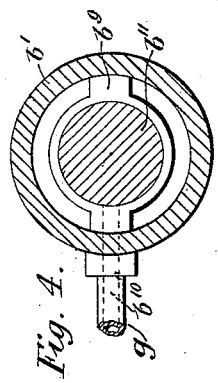
Figure 5:
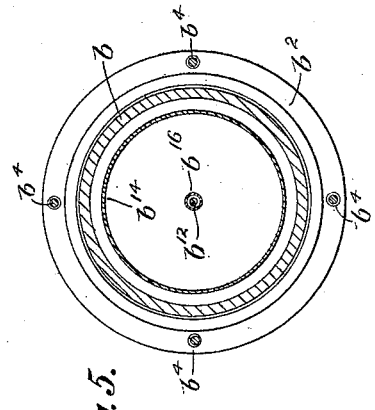
Figure 2:
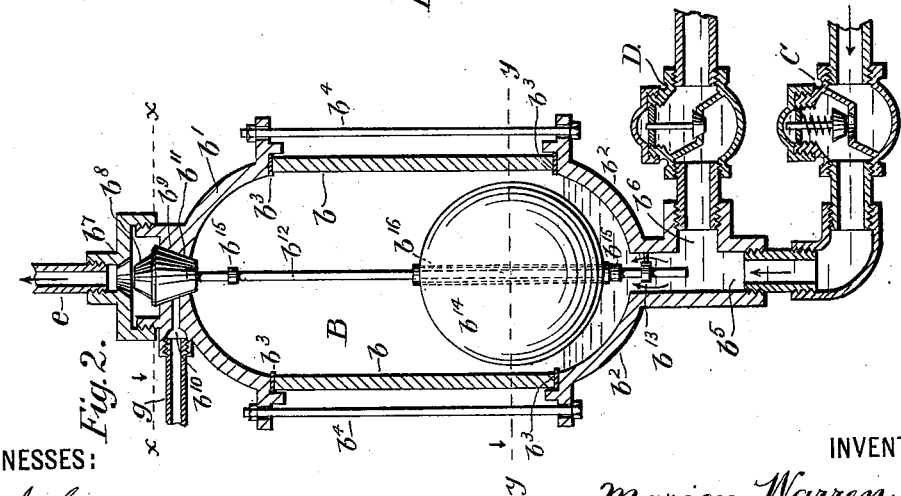

In the drawings, Figure 1 is a view in elevation (partly in section) of the apparatus embodying my invention. Fig. 2 is a sectional elevation of the circulating chamber in its passage through which the beer is subjected to the action of the partial vacuum. Fig. 3 is a similar view showing the operating parts in a different position. Fig. 4 is an enlarged horizontal section on the line $x\ x$ (Fig. 2). Fig. 5 is a horizontal section on the line $y\ y$ (Fig. 2), and Fig. 6 is a view in elevation showing the apparatus connected to a series of casks.

Similar reference characters are employed to designate corresponding parts in all the views.

Before proceeding to describe the construction and operation of my invention, I desire to state that the same is intended primarily for use in the manufacture of lager beer; but that it is not my intention to restrict the invention to that specific use of the apparatus. I also contemplate the employment of the apparatus at various stages in the manufacture of the beer. It may for instance be employed during the first fermentation period in connection with an improved process of treating beer during such period, which I have invented and for which I am about to file an application for Letters Patent. It may also be employed in treating the beer after the violence of the main or first fermentation has subsided in carrying out the process described and claimed in my said patent, and for the purpose of clearly describing the operation of my invention, I will in this application describe it as employed in the manufacture of lager beer during the last mentioned period, to wit, after the violence of the main fermentation has subsided.

In the drawings, A is a vessel which is provided with an opening in the top or head, and which may be similar to the ordinary "ruh" casks at present employed in most breweries, which are commonly of large dimensions, sometimes holding several hundred barrels. In the upper part of the vessel A is suspended a perforated pipe A' in such position as to be well covered by the beer when the vessel is filled; and a similar pipe $A^2$ is suspended in the lower part of said vessel.

B is the circulating chamber in which the beer is subjected to a partial vacuum, and which in the specific form herein shown, but to which I do not intend to limit the invention, consists of a cylindrical shell or casing $b$ (preferably of transparent glass) held between the flanged heads $b'$ and $b^2$. The joints between the said casing and the heads are preferably provided with gaskets $b^3$ of rubber or other suitable material, so as to be air and water tight. The heads $b'$ $b^2$ are securely held together by the bolts $b^4$, which pass through holes in the projecting flanges of the heads. The head $b^2$ is provided with the inlet port $b^5$ and the outlet port $b^6$, both of which communicate with the interior of the chamber. The inlet port $b^5$ is connected with the pipe $A^2$ by suitable pipe or hose connections as shown, and in the pipe between said inlet port $b^5$ and the pipe $A^2$ is mounted a valve C, which is arranged to automatically open the passage between said pipe $A^2$ and the inlet port $b^5$ when the pressure in the chamber B falls below a certain predetermined limit, and to automatically close said passage when the pressure in said chamber B exceeds said predetermined limit.

The valve C is suitably loaded, either by weights as shown in Fig. 1, or an adjustable spring, as shown in Fig. 2, in a manner well understood by mechanics, to work within the desired limits of pressure.

The outlet port $b^6$ is connected with the pipe A' by suitable pipe or hose connections, as shown, and in such connecting pipe is placed a check valve D, which may also be properly loaded to work within any desired limits. This valve D is arranged to shut off communication between the pipe A' and the chamber B when the pressure in the latter falls, and to open such communication when the pressure in the chamber rises.

The head b' is centrally apertured, and is provided with a cap $b^7$, into which a pipe e communicating with the main vacuum pipe E is screwed. A partial vacuum is maintained in said pipe E by the vacuum pump F, to the induction chamber of which said pipe E is connected in any suitable manner. The cap $b^7$ is apertured to receive the connection e from the main vacuum pipe E, and the under side of said aperture is formed with a conical valve seat adapted to receive the valve $b^8$ (Fig. 3) which controls communication between the vacuum pipe E and the chamber B. A web $b^9$ as shown in Fig. 3 extends across, but does not close, the aperture in the head $b^2$. Through the web $b^9$ is bored a vent or passage $b^{10}$, which communicates by means of a suitable pipe g or hose connections with the main pressure pipe G. The pipe G is suitably connected with the tank H, into which the carbonic acid gas extracted from the chamber B is forced by the pump F. The tank H is provided with a safety valve and gages, as shown, and the pressure in the tank and in the main pressure pipe G is regulated as desired, and is normally maintained sufficiently high to force the beer gently from the chamber B into the cask or vessel A, when the vacuum in the chamber is relieved by opening the vent $b^{10}$, through which communication is established between the chamber B and the pressure pipe G. The vent $b^{10}$ is opened and closed by the valve $b^{11}$, which when it rests on the inclined surface of the central aperture in the web $b^9$ (Fig. 2) closes the vent $b^{10}$, and thus shuts off the pressure in the pipe G from the chamber B. The valves $b^8$ and $b^{11}$ are preferably carried by a vertically movable spindle $b^{12}$, which plays in a suitable guide $b^{13}$ arranged near the lower portion of the chamber B. A hollow air tight ball or float $b^{14}$ is mounted to slide on the spindle $b^{12}$, its movement on the spindle being limited by the stops $b^{15}$ on said spindle. This float may be constructed of copper or other suitable material, and is provided with a central tube $b^{16}$ through which the spindle passes loosely. The float is of the proper weight and capacity to float readily in the beer or other liquid entering the chamber B.

Suitable stop valves and other accessories are provided where desired, and the pipe leading from the pump to the gas tank may if desired be provided with a suitable drainage trap.

The arrangement of apparatus at present contemplated by me is such that each of the casks A in the brewery will be connected substantially as shown with a circulating chamber, while one gas tank and one vacuum pump will, on account of the employment of pressure and vacuum mains running to all parts of the cellar, be sufficient to operate the entire plant as indicated in Fig. 6. The pipe E and its connecting pipes may, if desired, be sufficiently large to serve as an equalizing-chamber for the vacuum, or this end may be attained in any well known way, should the necessity therefor exist.

The operation of the apparatus as employed in the treatment of beer after the violence of the main fermentation has subsided is as follows: The vessel A is filled with the beer, in the proper condition. The beer will flow through the pipes A' $A^2$, and connections, to the check valves C and D, where it is stopped by said valves. The stop valves in the pipe or connections between the chamber B and the main vacuum pipe E are then opened, and communication is immediately established between the vacuum pipe and the chamber B through the aperture in cap $b^7$, the valve $b^8$ being normally open as shown in Fig. 2. The pressure in the chamber B immediately falls, and when it reaches the point at which the valve C has been set to operate, said valve C will open, and the beer will flow through it into the chamber B. As the beer rises in the chamber B, the float $b^{14}$ will rise with it on the spindle $b^{12}$. When the float engages the upper stop on said spindle, the latter will be carried up also, and when the chamber is thus sufficiently filled, the valve $b^8$ will close the aperture above it, shutting off all communication with the vacuum. As the rising of the float lifts the spindle, the valve $b^{11}$ will be lifted from its seat, and will open the vent or passage $b^{10}$ leading to the pressure pipe, thereby relieving the vacuum in the chamber. The increase of pressure in the chamber B will cause the valve C to close and the valve D to open, and the beer will be forced out of said chamber through the connecting pipes and pipe A' into the upper part of the vessel A, where it is delivered in the form of a fine spray, below the surface of the beer.

As the beer flows out of the chamber B, the float $b^{14}$ will slide down the spindle $b^{12}$ until its downward movement is arrested by the stop $b^{15}$ near the lower end of the spindle. Here the float rests until the bouyant action of the beer on the float is, by the continued outflow of the beer, sufficiently diminished to allow the weight of the float and spindle (which weight is properly adjusted for that purpose), to pull down the spindle $b^{12}$ and valve $b^8$ against the pressure of the gas in the chamber and the suction of the vacuum on the upper surface of said valve $b^8$. As the spindle descends under the action of such weight, it carries the valve $b^{11}$ to its seat, closing the vent $b^{10}$, and the valve $b^8$ having been drawn down from its seat, communication between the interior of the chamber B and the pipe E is immediately established, thereby at once reducing the pressure in the chamber B. Upon the reduction of pressure the valve C will open, and the valve D will close, and the beer from the vessel A will again flow into the chamber, filling it as before, when the operation just above described will be repeated.

It is to be understood that the vacuum or partial vacuum in pipe E and the pressure on pipe G are to be constantly maintained, during the treatment of the beer, within the limits previously determined by the brewmaster, and this end is preferably attained by the employment of suitable regulating devices, either on or in conjunction with the pump F in accordance with the well known practice.

It will thus be seen that the flow of the beer from the bottom to the top of the cask A through the chamber B in which it is subjected to the action of a partial vacuum will be continuously and automatically maintained and regulated.

I deem it unnecessary in this specification to repeat the details of the process described in my said patent further than to say that the apparatus when used in conjunction with said process, as herein specifically explained, would be erected in the storage cellars, as for instance where the ordinary ruh casks now employed are placed, and that a cool atmosphere is necessarily maintained in such cellars. The length of time required for treating the beer will vary with the size of the chamber B, with the rapidity with which the circulation is maintained, with the temperature, with the amount of vacuum employed, and will depend in all cases on the personal judgment of the brewmaster, who by testing the beer can determine when the requisite degree of ripeness is attained. The degree of vacuum to be maintained will also necessarily vary with the condition of the beer and the time allowed for treatment. I have found that a vacuum not exceeding eighteen inches of mercury may be advantageously employed; but this may be exceeded where it is desired to ripen the beer in the shortest possible time. The amount of pressure to be maintained on the main pressure pipe will be governed by the height of the beer in the vessel A above the outlet of the chamber B. It should be just sufficient to gently force the beer out of the chamber and through the perforations in the pipe $A^2$. In fact, where the construction is permissible, the pressure pipe may be entirely dispensed with by simply elevating the chamber B above the pipe A', and permitting the vent $b^{10}$ to communicate with the outer air, when the pressure of the atmosphere alone will be sufficient to relieve the vacuum and discharge the chamber B, when the valve $b^8$ is closed and the valve $b^{11}$ is opened, and I intend that my claims herein shall cover this and other means of relieving the vacuum in the chamber B, whether by the admission of the carbonic acid gas drawn from said chamber, or by the admission of air alone, and whether the pressure thereof equals or exceeds that of the atmosphere. Where air is employed to relieve the vacuum, it is desirable to filter it before admitting it to the chamber.

By means of my improvement, the beer is automatically circulated gently and continuously from the bottom of the cask A, where the pressure is greatest, and where the beer is heavily charged with carbonic acid gas, to the top thereof, where the pressure is negligible, through a chamber in which it is subjected to the action of a partial vacuum, until the beer is sufficiently treated. Furthermore, I obviate the necessity of applying a pump to each of the casks A in the brewery, as one pump will be sufficient to establish and maintain a sufficient vacuum to operate an entire plant. The circulating chamber, which is intended to be attached to each of said casks, is simple, inexpensive and reliable in its operation, and can be constructed and connected to occupy but little space in the cellar. Under ordinary conditions, I prefer to construct the chambers to contain about five gallons; but their capacity can be varied to suit the requirements of the brewery in which they are to be used.

By constructing the shell $b$ of glass, the action of the apparatus and the condition of the beer may be observed at all times.

I do not intend to limit my invention to the use of any specific form of vacuum pump since it is obvious that any form of apparatus or device by which a partial vacuum may be created or maintained in the chamber B may be substituted for the pump F shown in the drawings, and I employ the term "vacuum pump" herein to denote any such apparatus or its equivalent.

Having thus described my invention, what I claim as new, and desire to secure by Letters Patent, is—

1. In apparatus for treating beer and other liquids the combination of the vessel A, the chamber B provided with inlet and outlet ports, a valve for the inlet port arranged to be opened by a reduction of pressure in said chamber, a valve for the outlet port arranged to be opened by an increase of pressure therein, pipes connecting said inlet and outlet ports with the vessel A, a vacuum pump connected with the chamber B, whereby a partial vacuum may be created in said chamber, a vent for relieving the vacuum in said chamber, valves for controlling communication through said vacuum pump-connection and through said vent, and mechanism substantially as described, actuated by the filling and emptying of the chamber B for opening and closing said valves, substantially as shown and described.

2. In apparatus for treating beer and other liquids, the combination of the vessel A, the chamber B provided with inlet and outlet ports, a valve for the inlet port arranged to be opened upon a reduction of pressure in said chamber, a valve for the outlet port arranged to be opened upon an increase of pressure therein, pipes connecting said inlet and outlet ports with the vessel A, a vacuum pump connected with the chamber B, whereby a partial vacuum may be created in said chamber, a pressure tank also connected with said chamber, valves for controlling communication with said pump and tank respectively, and mechanism, substantially as described, actuated by the filling and emptying of the chamber B, for opening and closing said valves, substantially as shown and described.

3. In apparatus for treating beer and other liquids the combination of the vessel A, the chamber B provided with inlet and outlet ports, a valve for the inlet port arranged to be opened by a reduction of pressure in said chamber, a valve for the outlet port arranged to be opened by an increase of pressure therein, pipes connecting said inlet and outlet ports with the vessel A, a vacuum pump connected with the chamber B, whereby a partial vacuum may be created in said chamber, a vent for relieving the vacuum in said chamber, valves for controlling communication through said vacuum pump-connection and through said vent and a float in the chamber B for actuating said valves, substantially as shown and described.

4. In apparatus for treating beer and other liquids the combination of the vessel A, the chamber B provided with inlet and outlet ports, a valve for the inlet port arranged to be opened by a reduction of pressure in said chamber, a valve for the outlet port arranged to be opened by an increase of pressure therein, pipes connecting said inlet and outlet ports with the vessel A, a vacuum pump connected with the chamber B, whereby a partial vacuum may be created in said chamber, a vent for relieving the vacuum in said chamber, a movable spindle in said chamber, a valve carried by said spindle for opening and closing communication with the vacuum pump, a valve carried by said spindle for opening and closing the vent through which the vacuum is relieved and a float mounted on said spindle for actuating said valves, substantially as shown and described.

MARION WARREN.

Witnesses:
S. G. METCALF,
WM. W. SHAW.